(12) United States Patent
Oh et al.

(10) Patent No.: US 7,280,478 B2
(45) Date of Patent: Oct. 9, 2007

(54) CONTROL PACKET STRUCTURE AND METHOD FOR GENERATING A DATA BURST IN OPTICAL BURST SWITCHING NETWORKS

(75) Inventors: Se-Yoon Oh, Incheon (KR); Minho Kang, Daejeon (KR)

(73) Assignee: Information and Communications University Educational Foundation (KR)

( * ) Notice: Subject to any disclaimer, the term of this patent is extended or adjusted under 35 U.S.C. 154(b) by 1156 days.

(21) Appl. No.: 10/273,075

(22) Filed: Oct. 16, 2002

(65) Prior Publication Data

US 2003/0099243 A1     May 29, 2003

(30) Foreign Application Priority Data

Nov. 27, 2001   (KR) ................. 2001-74265

(51) Int. Cl.
    *H04L 12/26* (2006.01)
(52) U.S. Cl. ................. 370/235; 370/400; 398/45
(58) Field of Classification Search .......... None
    See application file for complete search history.

(56) References Cited

U.S. PATENT DOCUMENTS

| | | | |
|---|---|---|---|
| 6,671,256 B1 * | 12/2003 | Xiong et al. | 370/230 |
| 6,721,315 B1 * | 4/2004 | Xiong et al. | 370/389 |
| 6,898,205 B1 * | 5/2005 | Chaskar et al. | 370/450 |
| 6,956,868 B2 * | 10/2005 | Qiao | 370/466 |
| 7,042,906 B2 * | 5/2006 | Qiao et al. | 370/468 |
| 7,054,557 B1 * | 5/2006 | Dasylva et al. | 370/395.2 |
| 2002/0118419 A1 * | 8/2002 | Zheng et al. | 359/139 |
| 2002/0118420 A1 * | 8/2002 | Liu | 359/139 |
| 2002/0118421 A1 * | 8/2002 | Xiong et al. | 359/140 |
| 2002/0141398 A1 * | 10/2002 | Qiao et al. | 370/360 |
| 2002/0154360 A1 * | 10/2002 | Liu | 359/135 |
| 2003/0067919 A1 * | 4/2003 | Qiao et al. | 370/392 |

OTHER PUBLICATIONS

Xiong, Y. et al "Control Architecture in Optical Burst-Switched WDM networks" IEEE Journal on Selected Areas in Communications, vol. 18, No. 10, Oct. 2000, pp. 1838-1851.*

Ge, A. et al "On Optical Burst Switching and Self-Similar Traffic" IEEE Communications Letters, vol. 4, No. 3, Mar. 2000, pp. 98-100.*

* cited by examiner

*Primary Examiner*—Chi Pham
*Assistant Examiner*—Anh-Vu Ly
(74) *Attorney, Agent, or Firm*—Anderson Kill & Olick, PC

(57) ABSTRACT

A control packet of an OBS network comprises a label which is switched for fast transmitting each packet from a source host to a corresponding destination host, a wavelength ID for distinction of channel and switching, a CoS field providing different type of CoS, an offset time indicating the difference between an arrival time of the control packet and an arrival time of the data burst, a data burst size and a CRC for error detecting. A data burst generation algorithm uses hysterisis characteristics in the queueing model for an ingress edge node in an optical burst switching network. This algorithm adaptively changes the data burst size according to the offered load and offers high average data burst utilization with a lower timer operation.

12 Claims, 20 Drawing Sheets

LABEL INFORMATION TABLE

| Input Port | Input Wavelength | Input Label | Output Port | Output Wavelength | Output Label |
|---|---|---|---|---|---|
| 1 | 3 | 32 | 3 | 2 | 22 |
| ... | ... | ... | ... | ... | ... |

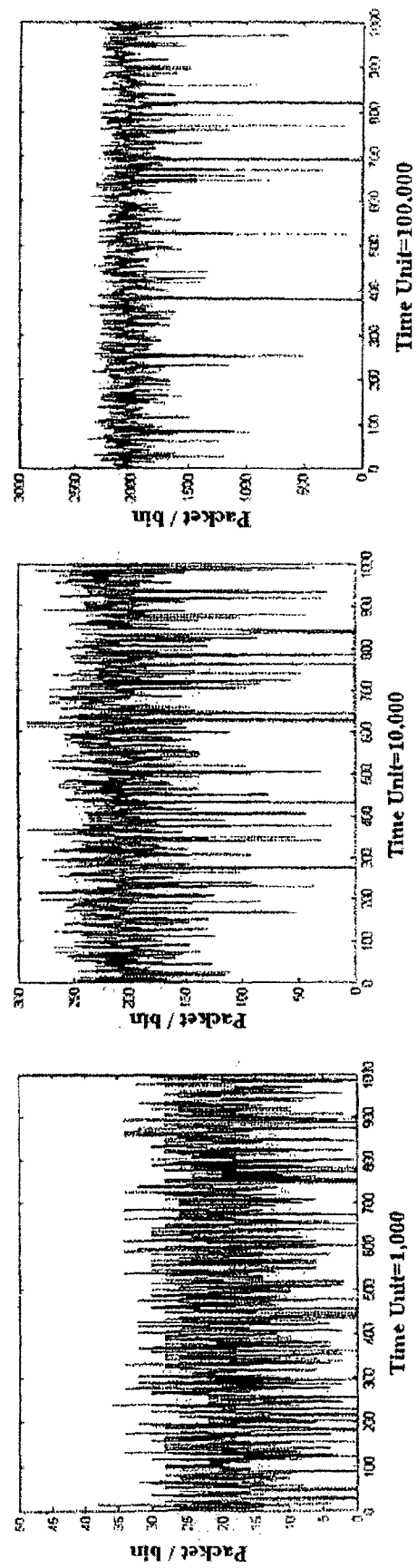

TRAFFIC 4 (H=0.8)

CONTROL PACKET STRUCTURE AND METHOD FOR GENERATING A DATA BURST IN OPTICAL BURST SWITCHING NETWORKS

FIELD OF THE INVENTION

The present invention relates to an optical burst switching (OBS) network; and, more particularly, to a multiprotocol label switching (MPLS)-based OBS control packet structure and a new burst assembly algorithm that uses hysteresis characteristics in a queueing model for an ingress edge node in the OBS network.

BACKGROUND OF THE INVENTION

Internet traffic has been growing exponentially and is expected to be more than 10 times that of voice traffic by the year 2005. This situation has triggered many research activities on wavelength division multiplexing (WDM) transmission and optical switching technologies. Considering the trend in IP network and the advance in optical technology, the next generation Internet will apparently depend on WDM network to transport expected huge amounts of Internet traffic.

Optical network based on WDM are evolving from present point-to-point transport links over add/drop multiplexers (ADM) and cross-connects for ring and mesh network, to network with higher reconfiguration speed. In the long term, optical packet switching seems to be a promising technology, but due to its complexity, much further research seems to be needed before it can be employed in a practical application.

The current use of a circuit switching mechanism is relatively simple to realize but requires a certain amount of time for channel establishment and release independent of the connection holding time. This overhead, mainly determined by the end-to-end signaling time, leads to poor channel utilization if connection holding time is very short. Research efforts to optimize network resources and protocols for IP traffic have focused on network architectures that can rapidly adapt to changes in traffic patterns as well as traffic loads.

Optical packet switching allows good bandwidth utilization, latency, and adaptability in an optical domain. At present, however, the optical packet switching is difficult to implement due to the lack of optical Random Access Memory (RAM) and other necessary signal processing capability.

Optical burst switching is spot lighted because it comprises IP over WDM circuit switching and pure optical packet switching with limited use of optical buffers. In optical burst switching technology, burst data can be transported without optical RAMs at intermediate nodes. In the OBS, a data burst cuts through intermediate nodes without being buffered, whereas in packet switching, a packet is stored and forwarded at each intermediate node. Compared to optical circuit switching, the OBS can achieve better bandwidth utilization because it allows statistical sharing of each wavelength among the flow of bursts that may otherwise consume several wavelengths. In addition, a burst will have a shorter end-to-end delay since the offset time used in the OBS is often much shorter than the time needed to set up a wavelength path in a wavelength routed network. However, the optical burst switching requires fast optical switching, which is still in a stage of research.

In order to implement the OBS network, there are a lot of challenging issues to be solved. The edge router, burst offset time management, and burst assembly mechanism are critical issues. In addition, the core router needs data burst and control header packet for scheduling, a protection and restoration mechanism, and a contention resolution scheme. The configuration and functions of the control plane in the OBS, including the control packet, are not yet standardized.

Since 1980, various electrical burst-switching techniques have been proposed: TAG (Tell-and-go), IBT (in-band-terminator) and RFD (reserve-a-fixed-duration), and so on. The TAG technique is similar to fast circuit switching. It transmits data bursts without an acknowledgement that bandwidth has been successfully reserved for the entire circuit. The IBT scheme reserves the bandwidth from the time the control packet is processed to the time the IBT is detected. In burst switching based on the RFD, bandwidth is reserved for a duration specified by each control packet; this eliminates signaling overhead and offers efficient bandwidth reservation.

JET (Just-Enough-Time) is a RFD-based burst switching protocol in the optical domain. It adopts two unique characteristics, namely, the use of offset time and delayed reservation. These features make JET and its variations more suitable for the OBS than OBS protocols based on the TAG or other one-way reservation schemes that do not adopt either or both of the features. The JET allows switching of data channels entirely in the optical domain by processing control packets in the electronic domain. A control packet precedes every data burst. Both the control packet and the corresponding data burst are separated by an offset time and are launched at a source node. The separate transmission and switching of data bursts and their headers help to facilitate the processing of headers and lower the optoelectronic processing capacity required at a core node. Moreover by assigning extra-offset time, the JET can be extended to support prioritized services in the optical domain.

The control packet contains information necessary for routing the data burst through the optical channel, as well as information on the length of the burst and the offset value. Another important characteristic of the JET is the delayed reservation. It reserves the bandwidth on each link just for the data burst duration. For example, let $t_1'$ be the time when a first control packet arrives at a node after a control packet is processed and the bandwidth is reserved for a period from $t_1$ (the time data burst arrives at a node) to $t_1+L_1$ (the data burst duration). This increases the bandwidth utilization and reduces the probability that a burst will be dropped. For example, in both cases shown in FIG. 1, namely $t_2>t_1+L_1$ (case 1) and $t_2<t_1$ (case 2), a second burst will not be dropped, provided that its length is shorter than that of $t_1-t_2$. However, when the second burst using the TAG arrives at $t_2'$, it will be dropped because there is no buffer for it.

The functional model of an IP over a WDM network with the OBS is shown in FIG. 2. At an ingress node 10, edge routers determine a data burst size 34 and an offset time after considering the input IP traffic. Control packets 32, which contain information including an egress address, an offset time, a data burst size, and a QoS, go ahead on separate control wavelengths, and the main data burst 34 follows the control packet after a given offset time. These control packets are converted to electrical signals for processing at every intermediate node.

At the core node, bandwidth is reserved for the transmission time of the data burst. The elements that need to be monitored in traffic engineering are blocking probabilities, latency, and processing time. This information determines the optical path at the ingress node 10. At an egress node 20, the data burst 34 is deframed and disassembled into multiple IP packets in a rather simple manner. Burst reordering and retransmission is handled in the egress node if required.

Parameters, such as offset time, burst size, and quality of service (QoS) values, are essential in achieving an OBS network. These parameters are assigned in the ingress node of the OBS network.

In FIG. 3, the functions of the ingress node 10 are described in more details.

The first step to aggregate incoming burst IP traffic streams into a data burst is to assemble the burst data at a packet assembler 10*a*. The assembled data is then classified based on the priority of the IP traffic in a classifier C. The traffic can be further classified into congestion-controlled traffic and non-congestion-controlled traffic in Internet Protocol version 6(IPv6). In the case of the non-congestion-controlled traffic, the traffic is divided into eight classes based on the blocking rate. In IPv4, a Type-of-Service (TOS) field in an IP header allows one to choose from none to all of the following service types: low delay, high throughput, and high reliability. It also allows a priority selection from 0-7. Thus, considering both service types, eight or more classes are possible in this classification. Another consideration for classification is routing information. Routing information contains a specific combination of fiber (or port number) and wavelength. Assembling packets in separate queues provide more distinguishable differences in grades than using a unified class queue.

It is considered that there are two ways to assemble multiple IP packets into an optical data burst. A segmented method separates IP packets whenever necessary as shown in FIG. 4A, while a non-segmented method constructs earlier data bursts with idle data and puts IP packets in latter data bursts as shown in FIG. 4B. The segmented method offers high bandwidth utilization but requires complex hardware and a protocol system. The non-segmented method can be achieved more easily than the segmented method and reduces complexity but suffers from lower bandwidth utilization. In the OBS, the processing burden is heavy in an ingress and an egress node and the non-segmented method is better suited for assembling data bursts in the OBS.

In a burst-length decision step, the burst size is determined based on burst of input IP data (queueing length), QoS, and so on. In the OBS network, an offset time is generated in an offset time generator 10*b* on the basis of a burst length decision, and a lower class (or higher blocking rate) data burst affects a higher class (or lower blocking rate) data burst because higher class traffic is protected by adding an extra offset time to a base offset time. A control packet generator 10*c* generates the control packet, which contains information such as an offset time, a burst size, and a class number. Data in a buffer is scheduled and framed for transmission through a designated fiber.

A burst comprises of a burst header and a data burst. In the OBS, a data burst and its header are transmitted separately on different wavelengths with the burst header first. Each control packet includes information on switching, a burst size, an offset time, etc. Yijun Xiong gave an example of a data burst format in "Control Architecture in Optical Burst-Switched WDM Networks", JSAC, VI, 18, No. 10, October 2000, but there has been no study on a control packet structure yet.

Meanwhile, at an edge node of the OBS network, edge routers assemble bursts by merging multiple IP packets. The data burst size should vary as little as possible, because a variation in large data burst size requires more extra-offset time for QoS which results in more delay. For reducing a variation of the data burst size, An Ge and Franco Callegati proposed a burst assembly algorithm using a timer-counter in "On Optical Burst Switching and Self-Similar Traffic", IEEE, Comm Vol. 4, No. 3, March 2000.

However, this scheme resulted in low data burst utilization in a low offered load and huge variation in the burst size because the data burst size was not optimized for the input traffic. Moreover, a burst assembly algorithm based on a timer-counter may cause continuous blocking of data bursts in the core router as illustrated in FIG. 5. For example, suppose that a first control packet arrives at $t_{CA}^1$, and a second control packet arrives at $t_{CA}^2$ from an ingress node A and the first control packet arrives at $t_{CB}^1$, the second control packet arrives at $t_{CB}^2$ from ingress node B. And then, first data from the node A arrives at $1_A^1$, second data from the node A arrives $1_A^2$ after an offset time in an intermediate node X, and the first data from a node B arrives at $1_B^1$, and the second data from the node B arrives at $1_B^2$ after the offset time in the intermediate node X. Each control packet requests a bandwidth reservation in the nod X, and the node X can only honor the bandwidth request of the nodes A and B. If the ingress nodes A and B use a same timer period, i.e., $T_{period-a} = T_{period-b}$, a timer-counter-based scheme causes a high rate continuous blocking rate in a low offered load in reserving the bandwidth.

For the above-described reason, an OBS control packet structure based on MPLS is needed and a burst generation algorithm is necessary to generate high utilization data bursts and less variation in the burst size.

SUMMARY OF THE INVENTION

It is, therefore, an object of the present invention to provide a control packet structure in an OBS network in which MPL(amda)S can be applicable to an OBS control plane by implementing an OBS control packet structure based on the MPLS.

Another object of the present invention is to provide a method for generating a data burst in an OBS network which has high average data burst utilization, a low timer operation frequency and also, as burst becomes high, reduces continuous blocking problems in a bandwidth reservation by using a non-periodic data burst assembly time.

Still another object of the present invention is to provide a method for generating a data burst in an OBS network which reduces a required burst size and limits a maximum queuing delay by increasing data burst utilization for burst input IP traffic.

In accordance with one aspect of the invention, there is provided a control packet of an OBS network including: a label which is switched to transmit in high speed a packet from a source host to a corresponding destination host; a wavelength ID (identifier) for distinguishing a channel and a switching in the OBS; a CoS (class of service) field for providing a different type of a CoS for the control packet; an offset time for indicating a difference between respective arrival times of a control packet and a data burst thereof; a data burst size; and a CRC (cyclic redundancy checking) for error detecting.

In accordance with another aspect of the invention, there is provided a method for generating a burst in an OBS network having the steps of: (a) after a timer begins to count as soon as a first packet arrives at a queue, creating a new burst if the counted value of the timer is larger than a threshold value or if the counted value is smaller than or equal to the threshold value and a size of the queue is larger than a transition condition ($Q_{low}$); (b) if the size of queue is larger than a transition condition ($Q_{high}$), increasing the counted value by 1 or if the size of queue is smaller than the transition condition ($Q_{low}$), decreasing the counted value by 1; (c) comparing a cross-over count number with each of an upper and a lower limit, and if the cross-over count number is larger than the upper limit, increasing the data burst size by one stage, and if the cross-over count number is smaller than the lower limit, decreasing the data burst size by one stage; and (d) resetting the counted value of the timer to 0 and repeating the steps (a) to (d).

BRIEF DESCRIPTION OF THE DRAWINGS

The above and other objects and features of the present invention will become apparent from the following description of preferred embodiments given in conjunction with the accompanying drawings, in which:

FIGS. 14A to 14E describe a count process for five different traffic models in accordance with the present invention;

DETAILED DESCRIPTION OF THE PREFERRED EMBODIMENTS

Multiprotocol Label Switching (MPLS) provides simple forwarding and supports explicit routing without requiring each packet to carry an explicit route by using a fixed length label and a forwarding equivalence class mechanism. In addition, the MPLS offers a mechanism for traffic engineering using explicit routing and high speed switching. There are several reasons to adopt an MPLS-like control plane in the OBS. Supervision of the whole process in an edge and a core node can be carried out by using the MPLS control plane. A concrete format and functions of a control packet in the OBS are not yet defined and these can be constructed by modifying the MPLS for the OBS control plane. By establishing a label switched path, an explicitly routed path can be made and the burden of control packet processing is relieved and also traffic engineering functions of the MPLS are provided. A new paradigm for the design of a control plane for optical cross-connectors (OXCs) intended for a data-centric automatically switched optical transport network was proposed in "A Framework for Multiprotocol Label Switching", IETF Draft, September 1999, by R. Callon, et. al. This new paradigm is termed multiprotocol lambda switching (MPλ S) and exploits recent advances in MPLS traffic engineering control plane technology to foster the expedited development and deployment of a new class of versatile OXCs that specifically address the optical transport needs of the Internet. In the MPλ S, the label information table, as shown in FIG. 7, at each node is configured by using an optical label based on wavelength in order to make a labeled switched path (LSP). The control plane using the MPλ S reduces the burden of maintaining an OBS network, such as interface definitions, label assignment, traffic management, and so on. In applying the MPλ S to the OBS control plane, the control packet structure for label, a wavelength identification, a CoS, an offset time, a burst size and a CRC are specified in FIG. 6.

Figure 1:
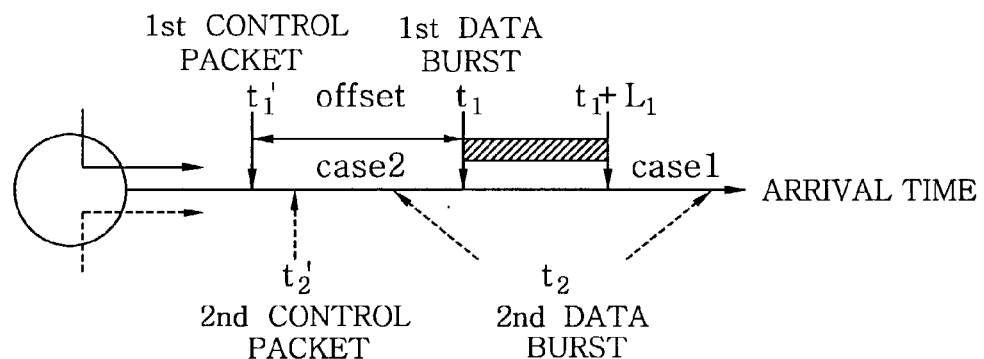
FIG. 1 illustrates an OBS using the JET protocol.
Figure 2:
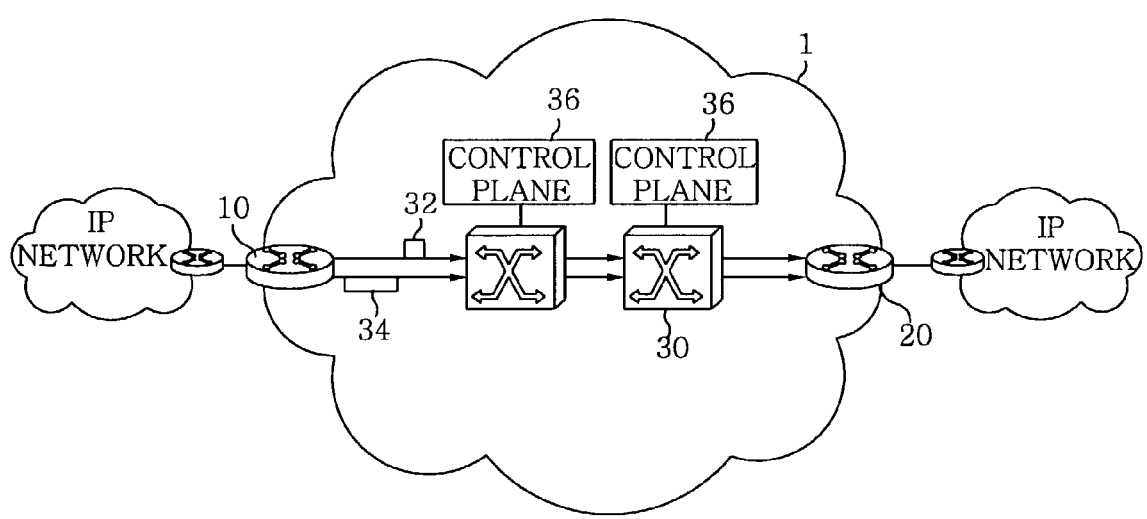
FIG. 2 exhibits a node functional model of the OBS network.
Figure 3:
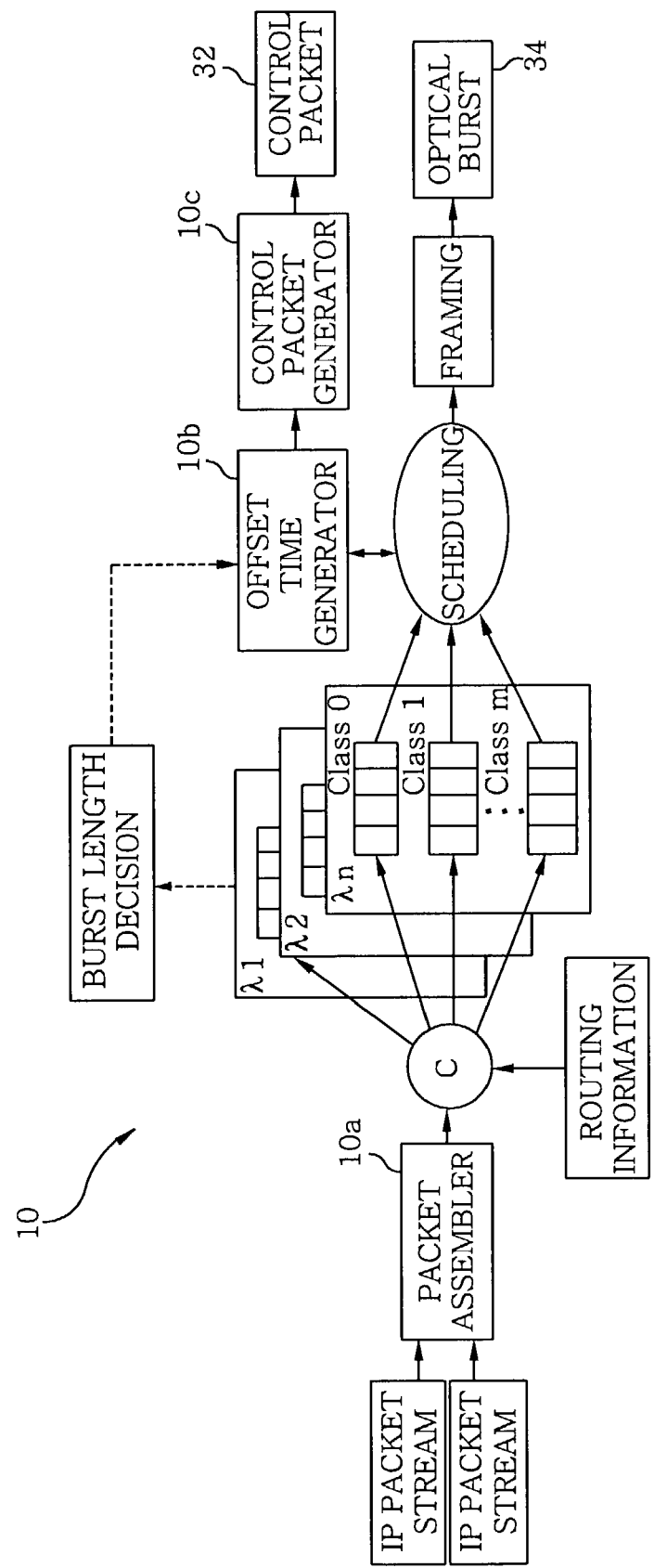
FIG. 3 shows a functional model of an ingress node in the OBS network.
Figure 4A:
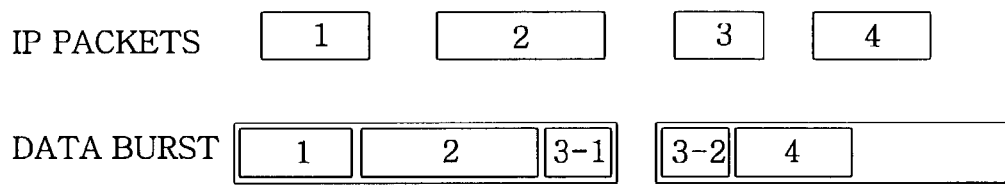
FIGS. 4A and 4B depict a data burst assembly method.
Figure 4B:
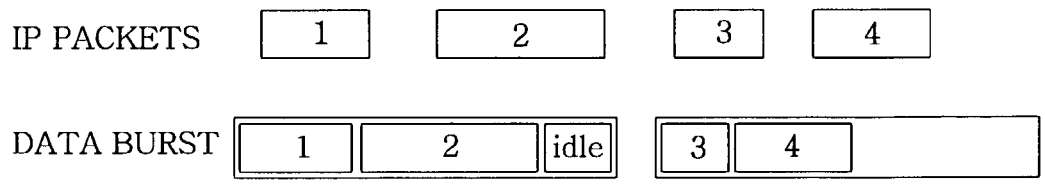
Figure 5:
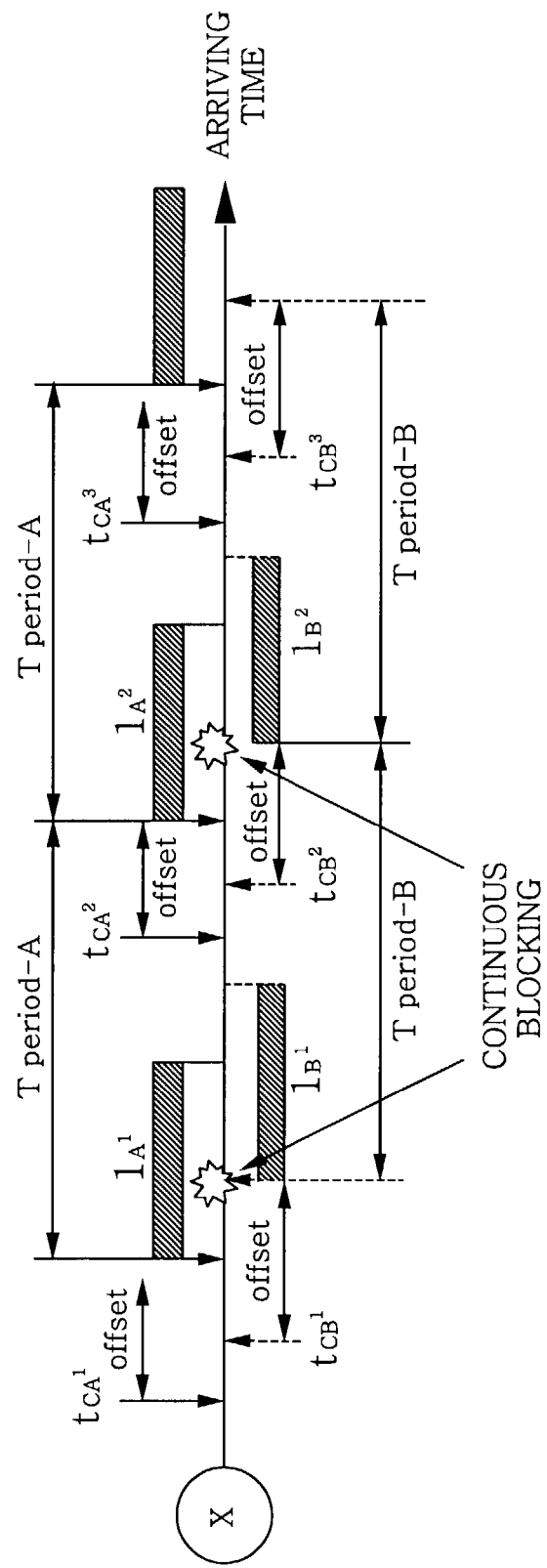
FIG. 5 sets forth continuous blocking of data burst in a core router for burst generation method when using a prior timer counter.
Figure 6:
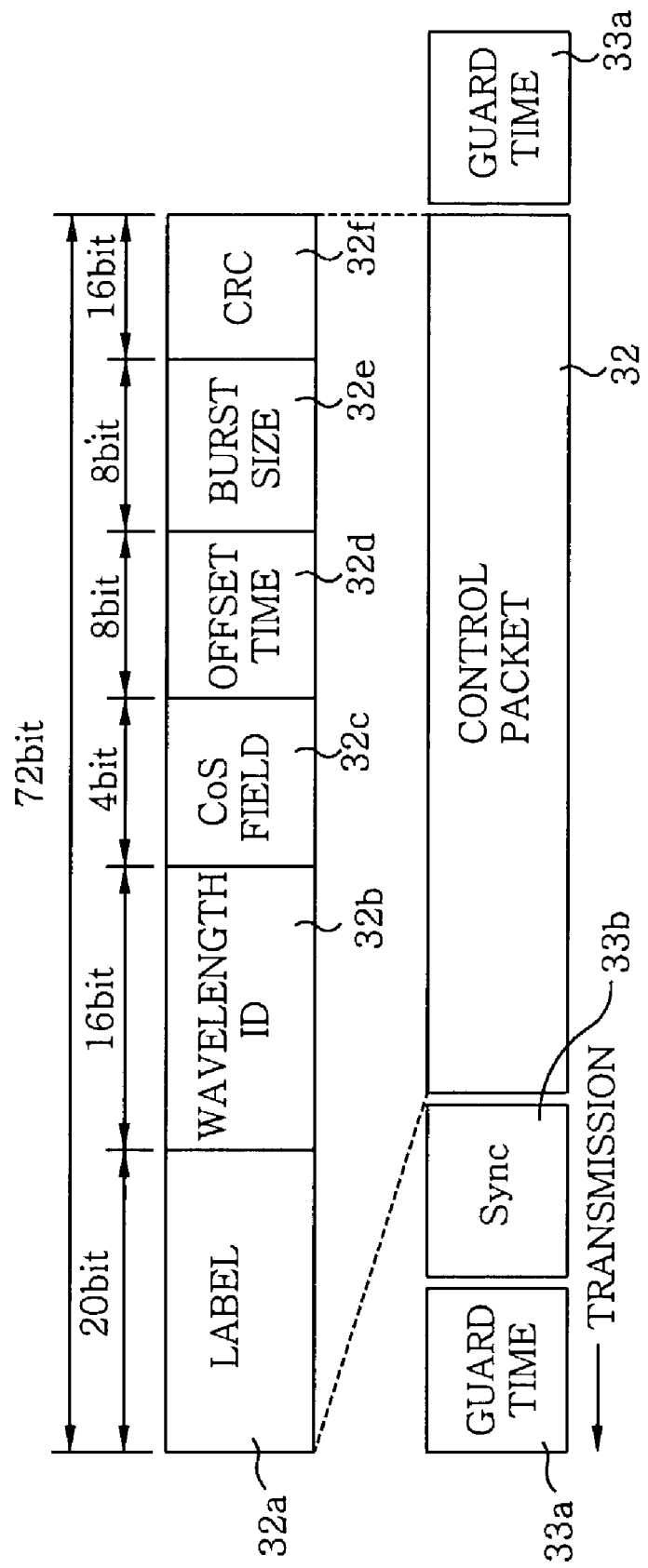
FIG. 6 describes a structure of a control packet in the OBS network in accordance with the present invention.
Figure 7:
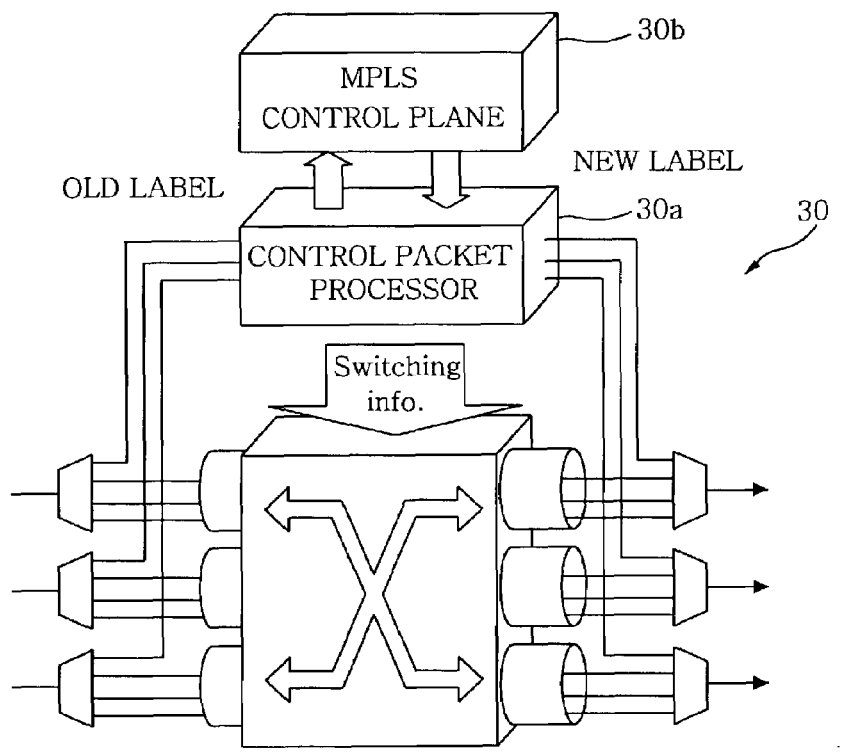
FIG. 7 provides a core node architecture using an MPLS control plane for the OBS in accordance with the present invention.

A label 32a is switched for fast transmitting of each packet from a source host to a corresponding destination host, wherein the label 32a has 20 bits, as shown in FIG. 6. When burst data is sent to a core node, a control packet processor takes a control packet, gets information on the burst size, the offset time, and the CoS and looks up a label information table in order to obtain output information, such as an output port, a wavelength, and a label.

A wavelength ID (identifier) 32b is contained in the control packet for distinction of channel and switching, including wavelength conversion in an optical burst switch. Since more than several hundreds of individual wavelengths should be available in a single fiber, 16 bits are assigned to the wavelength ID 32b for the future enhancements in the preferred embodiment of the present invention.

The MPLS offers 8 different types of the CoS, wherein the CoS needs 3 bits. Since the overall size of the control packet should be expressed in multiples of 8 bits, for example, 72 bits, 4 bits are assigned as a CoS field 32c in a preferred embodiment of the present invention.

An offset time 32d indicates a difference between an arrival time of the control packet and an arrival time of a data burst. To reduce the control burden, the control packet contention problem, and the complexity of scheduling, the offset time should be quantized to a discrete set of values and assigned by the multiples of 256 steps. The offset time is decreased at each intermediate node along the path by as much as the control packet processing time in control plane. The offset time can be used as time to live (TTL) in the OBS network by measuring its value.

A minimum size of a data burst 32e is determined by the electronic processing speed, a switching speed, and a maximum size of a single IP packet. The electronic processing speed of the control channel limits the number of control packets and the data burst transported per unit of time across the optical channel. Switching speed affects the data burst size. To achieve high bandwidth utilization, a data burst transmission time (burst size/optical channel speed) should be much larger than a switching time. As the switching speed becomes faster, the restriction due to switching speed soon becomes minimal. Finally, in order to avoid reassembly procedure for IP packets at an egress node the data burst size should be larger than the maximum size of a single IP packet (65,535 byte). Considering these restrictions, a reasonable minimum data burst size is 64 kbyte.

Figure 8:
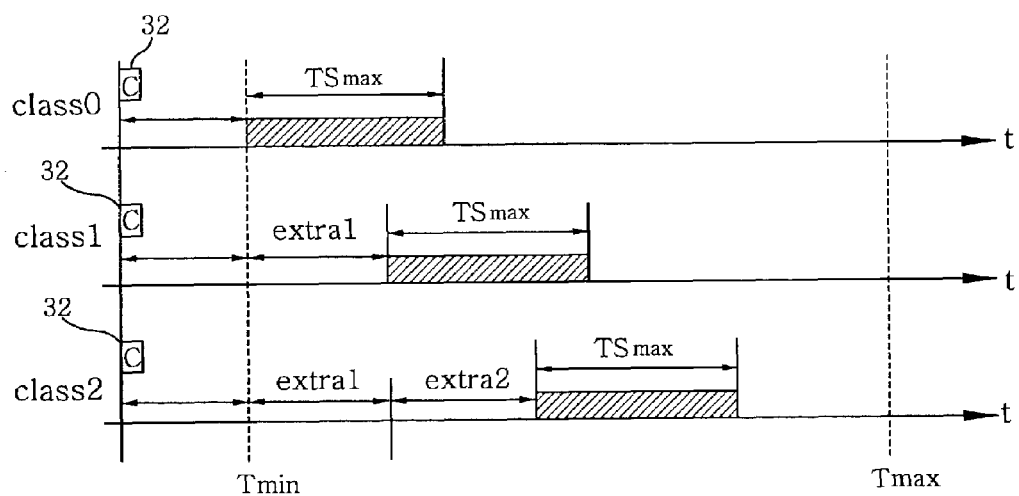
FIG. 8 presents an interrelation between a burst size and an offset time in a control packet in accordance with the present invention.

FIG. 8 shows an interrelation between the burst size 32e and the offset time 32d, wherein extra1(2) is an extra offset time of class 1(2), $T_{min}$ is a base offset time, $T_{max}$ is a tolerable delay of the IP packet, $TS_{max}$ is a transmission time of maximum size of the data burst and c is a control packet 32. To provide a lower blocking probability for a higher class data burst (class2), an offset time greater than the extra offset time of the lower class data burst (class1) should be assigned. Because the extra offset time of the higher class (class1) is determined by a lower class (class0) data burst size distribution, the maximum size of a data burst is determined based on a tolerable maximum delay of the IP packets in the OBS network.

Let the transmission time of the maximum size of the data burst be "$TS_{max}$" and let the OBS network offer n different classes with a 100% isolation degree (i.e, $TS_{max}$=extra1(2)). Then the maximum delay of a highest class traffic in the OBS network is "base offset time+$TS_{max}$·n+propagation delay." The tolerable end-to-end delay of delay sensitive Voice over Internet Protocol (VoIP) traffic is 150 ms. Assume that the tolerable delay of an IP packet, $T_{max}$ in the OBS network is 10 ms, a maximum number of hops is 5, and a control packet processing time is 1 ms. These assumptions yield a base offset time of 5 ms (maximum number of hop·control packet processing time). For example, taking a propagation delay of 3 ms into account by assuming an OBS network diameter of 600 km, $TS_{max}$ becomes 0.25 ms or the maximum data burst size at 10 Gbps becomes 313 kbyte. As with the offset time, 8 bits (256 steps) are assigned.

A CRC 32f is used for error detection, which is one of methods for verifying an error in transmitted data from communication link, to which 16 bits are assigned.

A guard time 33a is placed between control packets 32. The guard time helps to overcome the uncertainty in the packet arrival time.

Next, a new burst generation algorithm that uses hysteresis characteristics to solve this continuous blocking problem minimizes the timer operation frequency by maximizing burst utilization, and offers the optimized variable data burst size described.

Figure 9:
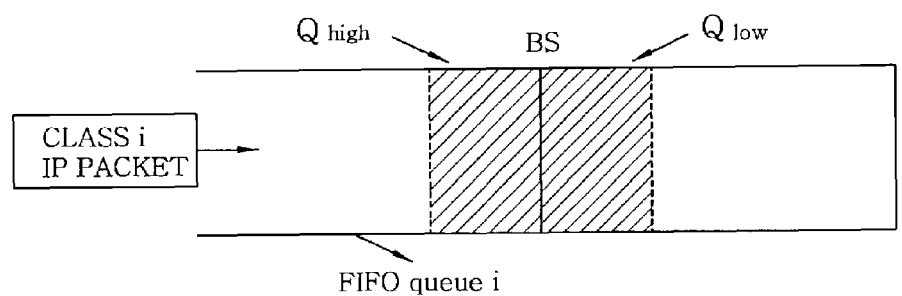
FIG. 9 depicts a class m FIFO queue model in accordance with the present invention.
Figure 10:
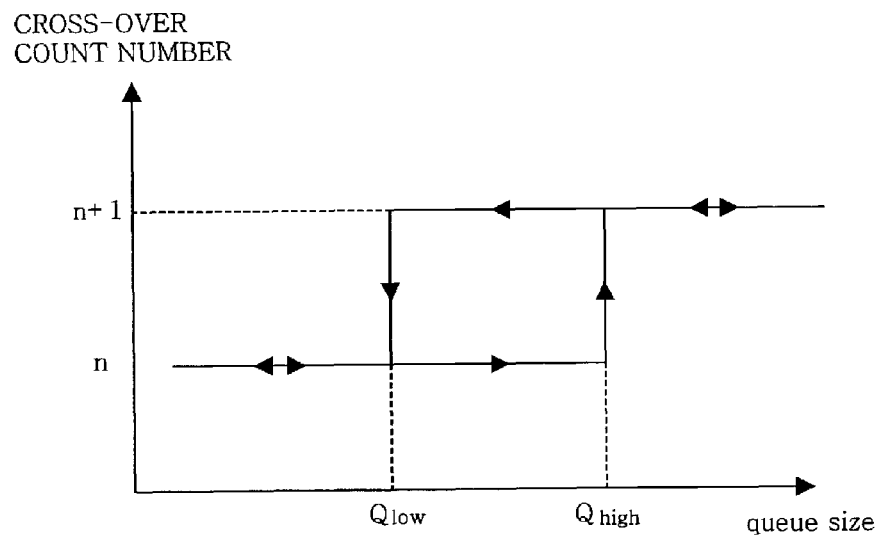
FIG. 10 represents hysteresis characteristics of a cross-over count number transition in the queue model of FIG. 9.

FIG. 9 shows a class m FIFO queue model for an ingress node in the OBS network and FIG. 10 shows the hysteresis characteristics of the cross-over count number transition in this FIFO queue model. $Q_{high}$ ($Q_{low}$) is the transition conditions for increasing (decreasing) the cross-over count number and BS is the burst size. A hysteresis characteristic for the transition condition assigning a redundancy from $Q_{low}$ to $Q_{high}$ in changing the cross-over count number is used to alleviate an excessive variation in a burst size transition when using a single threshold. In this way, the cross-over count number changes in accordance with the threshold values of $Q_{low}$ and $Q_{high}$.

To keep track of the arrival input traffic, the data burst-size (BS) should be adjusted accordingly. The burst size is determined either discretely or by continuously. Because the control burden is critical in optical burst switching, a discrete type burst-size decision algorithm that uses a hysteresis transition to relax a data burst-size optimization process for an arrival input traffic is more reasonable.

Figure 11:
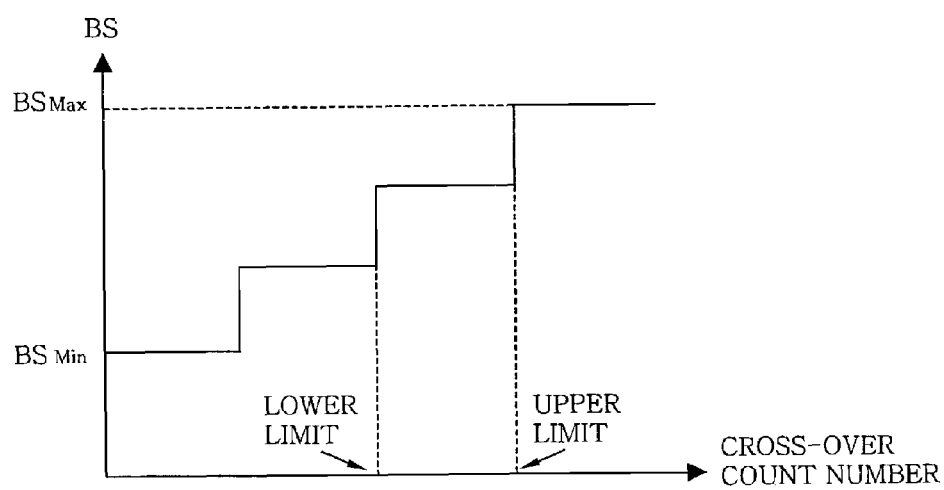
FIG. 11 sets forth a discrete type burst size decision scheme in accordance with the present invention.

FIG. 11 shows a discrete type burst size decision scheme. There are several stable states in the burst size in terms of the cross-over count number. If the cross-over count number exceeds a predetermined upper bound, the burst size is increased by one step. If the cross-over count number drops below a predetermined lower bound, the burst size is reduced by one step. This scheme offers less variation in the data burst size and a smaller control packet processing burden.

Since it may require a long time to generate a data burst when there is a low offered load, a timer is used to limit the waiting time of the packets in the burst assembly.

Figure 12:
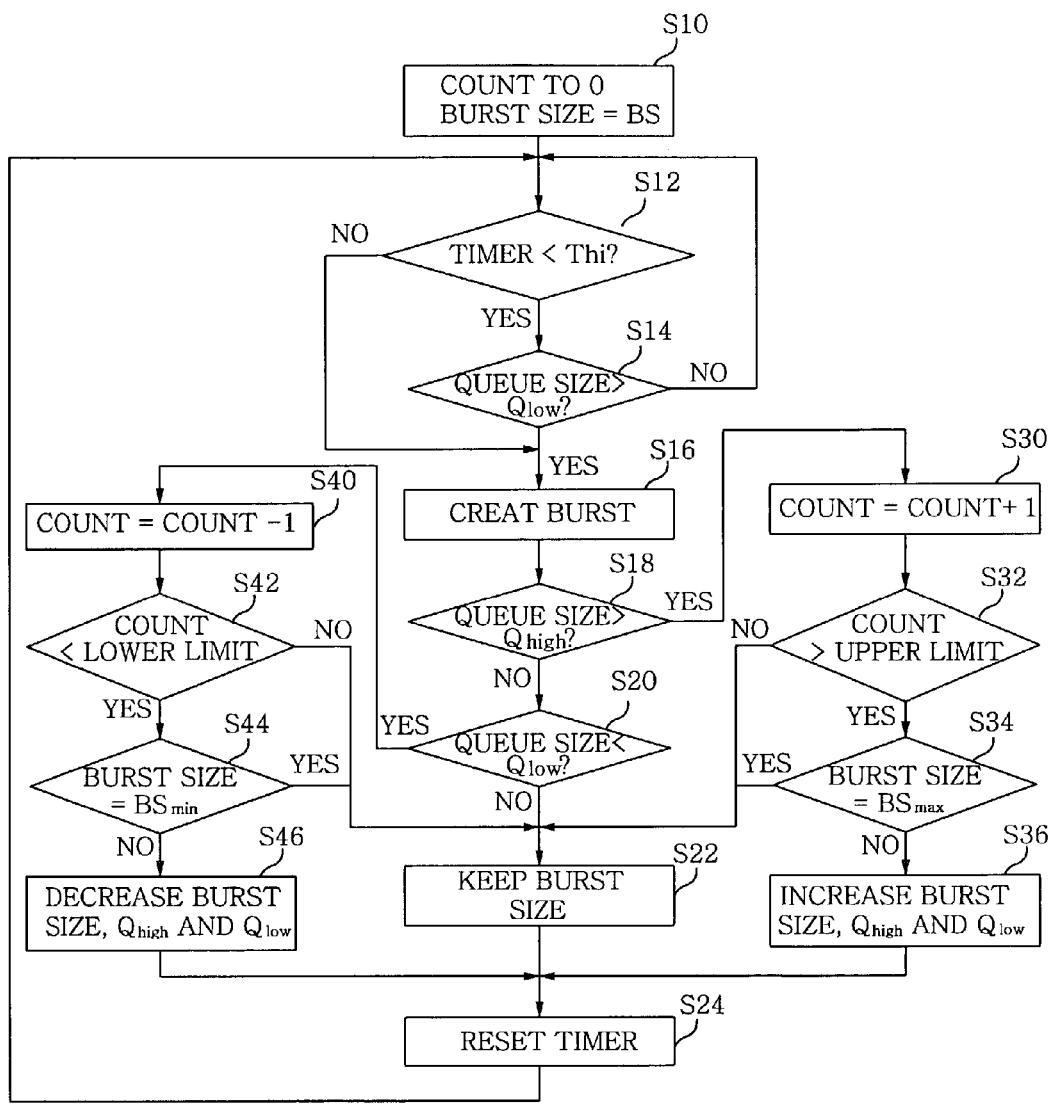
FIG. 12 offers a flow diagram showing a dynamic burst size decision algorithm in accordance with the present invention.

FIG. 12 shows an overall flow diagram for the dynamic burst size decision algorithm.

The timer is reset to count 0 at the time when a first packet arrives at queue (S10). Comparing timer counter value to a predetermined threshold value (S12), if the timer value reaches the threshold value (Thi), a new burst is created (S16).

In step S12, if the timer value is smaller than the Thi, a queue size is compared with a transition condition $Q_{low}$ (S14). And if the queue size is greater than the transition condition $Q_{low}$, a new burst is created (S16).

In step S14, if the queue size is smaller than the transition condition $Q_{low}$, the operation goes back to step S12 thereafter.

In case a new burst has been created in step S16, the queue size is compared with a transition condition $Q_{high}$(S18) If the queue size is greater than the transition condition $Q_{high}$, a cross-over count number is increased by 1 (S30), and if the queue size is smaller than the transition condition $Q_{high}$, the queue size is compared with the transition condition $Q_{low}$ (S20).

In step S20, if the queue size is greater than the transition condition $Q_{low}$, the burst size is not changed (S22) and if the queue size is smaller than the transition condition $Q_{low}$, the cross-over count number is decreased by 1 (S40).

After keeping the burst size in step 22, the timer value is reset to 0 (S24) and the operation goes back to step S12 thereafter.

If the cross-over count number has been increased in S30, the increased cross-over count number is compared with the upper limit thereof (S32). If the cross-over count number is greater than the upper limit, the burst size is verified to equal to maximum burst size $BS_{Max}$(S34). If the burst size is not equal to the maximum burst size, the burst size and the transition conditions $Q_{high}$ and $Q_{low}$ is increased (S36).

If the increased cross-over count number becomes smaller than the upper limit in step 32 or the burst size is determined to be equal to the maximum burst size in step S34, the burst size is not changed (S22).

If the cross-over count number has been decreased in S40, the decreased cross-over count number is compared with the predetermined lower limit (S42). If the cross-over count number drops below the lower limit, the burst size is checked whether or not it is equal to a minimum burst size $BS_{Min}$(S44). If the burst size is not equal to the minimum burst size, the burst size and the transition conditions $Q_{high}$ and $Q_{low}$ is decreased (S36).

If the cross-over count number is larger than the lower limit in S42 or the burst size is equal to the minimum burst size in S44, the burst size is not changed (S22).

After the burst size is preserved in the step 22, the timer value is reset to 0 (S24) and the operation goes back to S12 to repeat above-described steps.

This algorithm adaptively generates stage-wise data burst size and minimizes the required burst size for a burst IP traffic. The optimized data burst size enhances data burst utilization and finally reduces the variation in the burst size. Moreover, it diminishes timer operation frequency and also guarantees the maximum queuing delay by limiting waiting time by using a predetermined threshold value in the low offered load.

Simulating the behavior of the global Internet data network is a challenging undertaking because the IP network is greatly heterogeneous and changes rapidly. The heterogeneity ranges from the individual links that carry the network traffic to the protocols that interoperate over the links to the "mix" of different applications used at a site and the levels of load seen on different links. Murad Taqqu, Walter Willinger, and Robert Sherman mathematically explained the observed self-similarity in wide-area Ethernet traffic by aggregating simple renewal (ON-OFF) processes with self-similar behavior.

Figure 13:
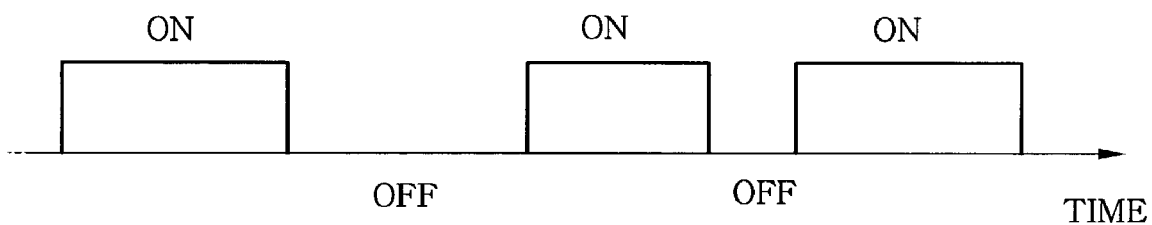
FIG. 13 shows an ON/OFF distribution self-similar traffic model.
Figure 14A:
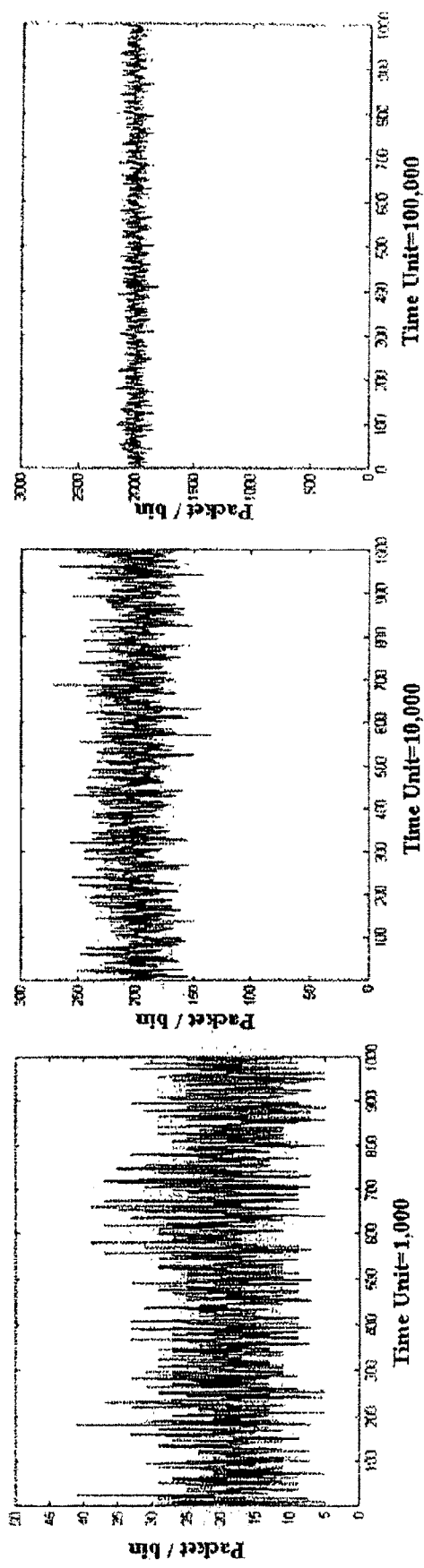
Figure 14B:
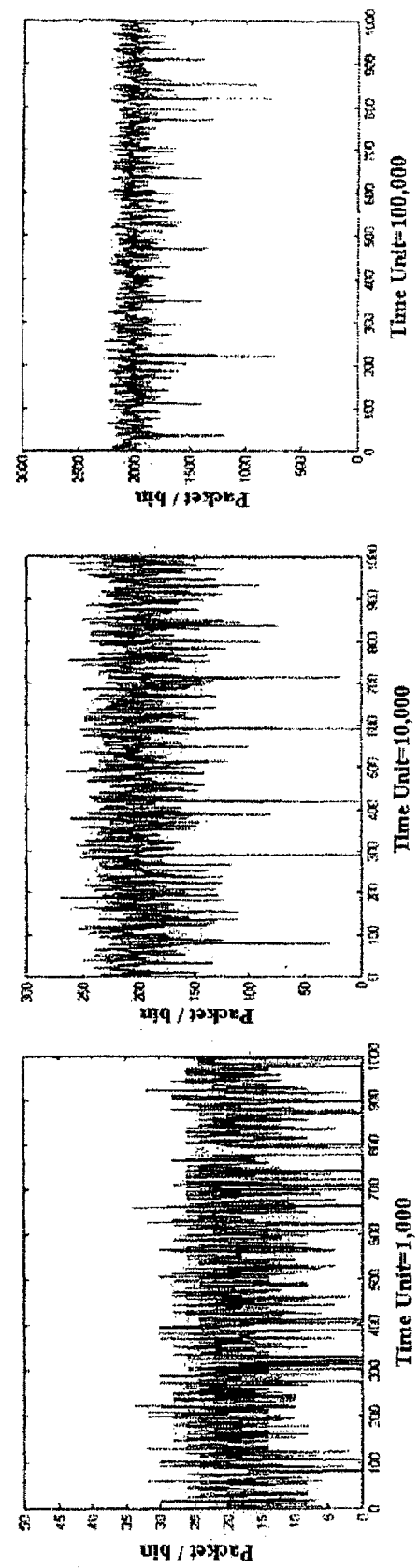
Figure 14D:
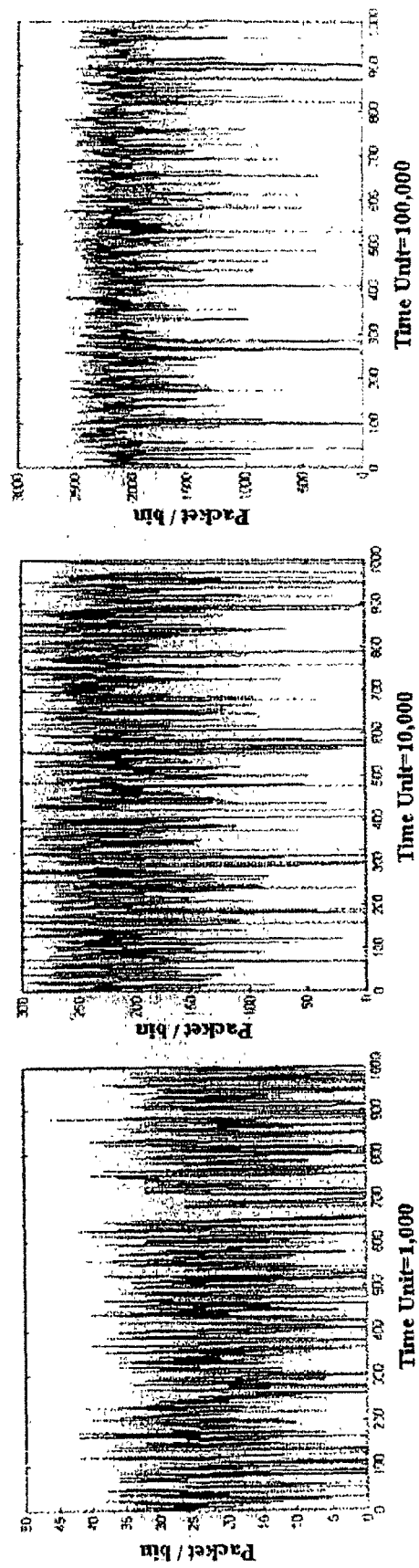
Figure 14E:
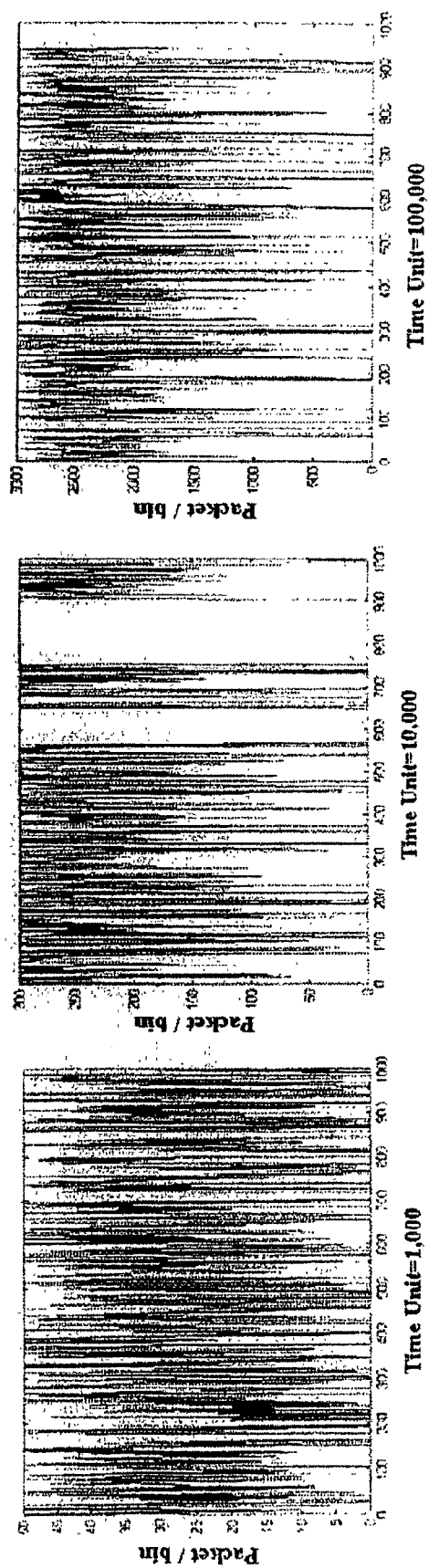

In this particular case, the traffic source comprises of packets transmitted at a constant rate during the ON period or is idle during the OFF period as shown in FIG. 13. The time spent during the ON state ($T_{on}$) or OFF state ($T_{off}$) is independent and identically distributed (i.i.d) and possesses a heavy tail distribution. A large number of aggregated sources result in traffic having self-similar characteristics.

The Hurst parameter (H) indicates the degree of self-similarity, i.e., the degree of persistence of the statistical phenomenon. H takes value from 0.5 to 1.0. A value of H=0.5 indicates the lack of self-similarity, whereas a large value for H (close to 1.0) indicates a large degree of self-similarity in the process.

TABLE 1

| Traffic Model | | ON period | OFF period |
|---|---|---|---|
| Poisson Traffic Model | Traffic 1 | Exponential | Exponential |
| Self-Similarity Traffic Model | Traffic 2 | Pareto(H = 0.6) | Pareto(H = 0.6) |
| | Traffic 3 | Pareto(H = 0.7) | Pareto(H = 0.7) |
| | Traffic 4 | Pareto(H = 0.8) | Pareto(H = 0.8) |
| | Traffic 5 | Pareto(H = 0.9) | Pareto(H = 0.9) |

Five different traffic models are generated as shown in Table 1. "Traffic 1" is a Poisson traffic model and "Traffics 2-5" are self-similar traffic models. In each traffic model, 1,000,000 packets with the ON/OFF traffic source model are generated.

FIGS. 14A to 14E depict a sequence of simple plots of the packet counts (i.e., the number of packets per time unit) for five different traffic models. The scale-invariant or self-similar feature of the traffic patterns are drastically different from the conventional Poisson traffic pattern (Traffic 1).

To evaluate the effect of a varying load and other parameters, each traffic model with an average value of 1 kbyte packet length and a varying burst ranging from H=0.6 to H=0.9 was generated and used to simulate the performance of the proposed burst generation algorithm in the ingress router. Assumed a data burst variation of 2% and set the default values of $BS_{Min}$, and $BS_{Max}$ to 64 kbyte and 180 kbyte, respectively. The default values performed well for the burst generation in the simulated traffic.

Figure 15:
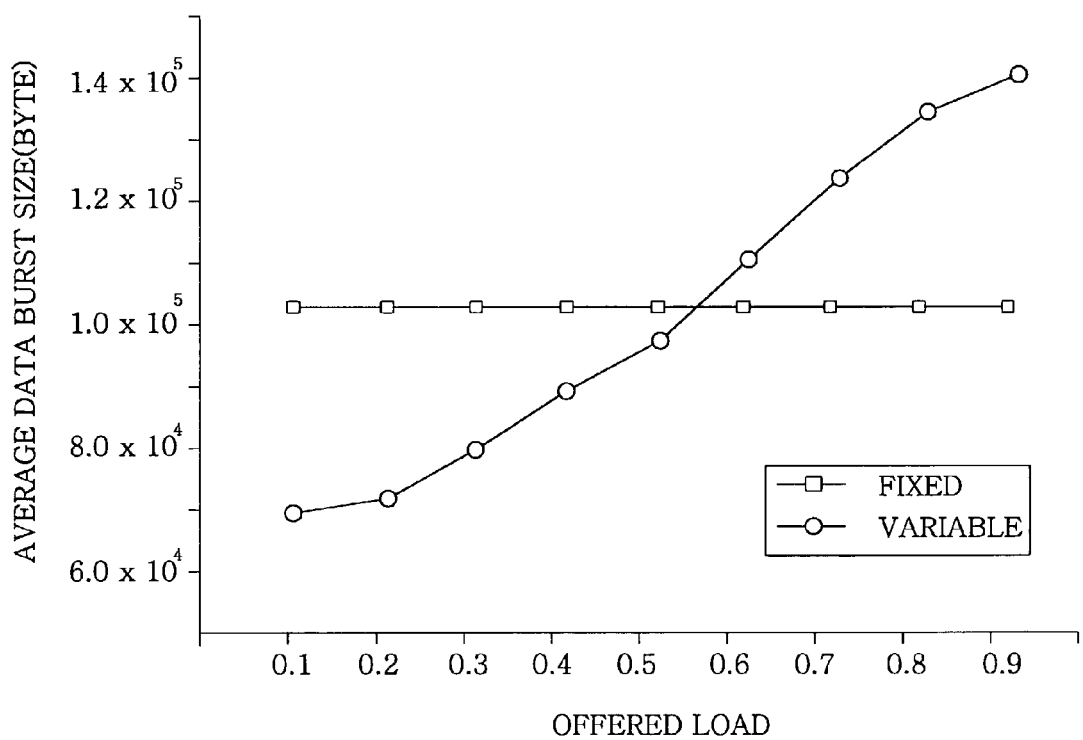
FIG. 15 illustrates an average data burst size for a fixed and a variable data burst for Poisson traffic model (Traffic 1) for an offered traffic load.

FIG. 15 compares the variations of the average data burst size as a function of the offered load. The data burst size changed adaptively to the offered load (Traffic model 1) with a variable burst size (BS).

Figure 16:
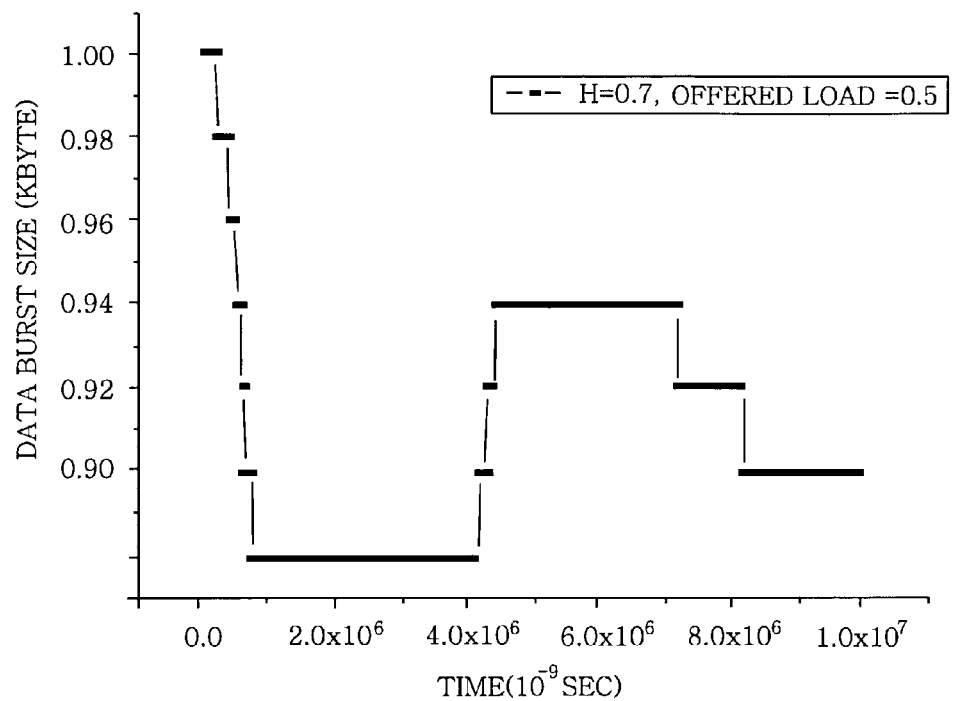
FIG. 16 offers a data burst size transition wherein H=0.7 and offered load=0.5.

FIG. 16 shows the transition of the data burst size in Traffic model 3 with an offered load of 0.5, wherein the data burst size changed adaptively in a 2% step of the data burst size was plotted against time.

Figure 17:
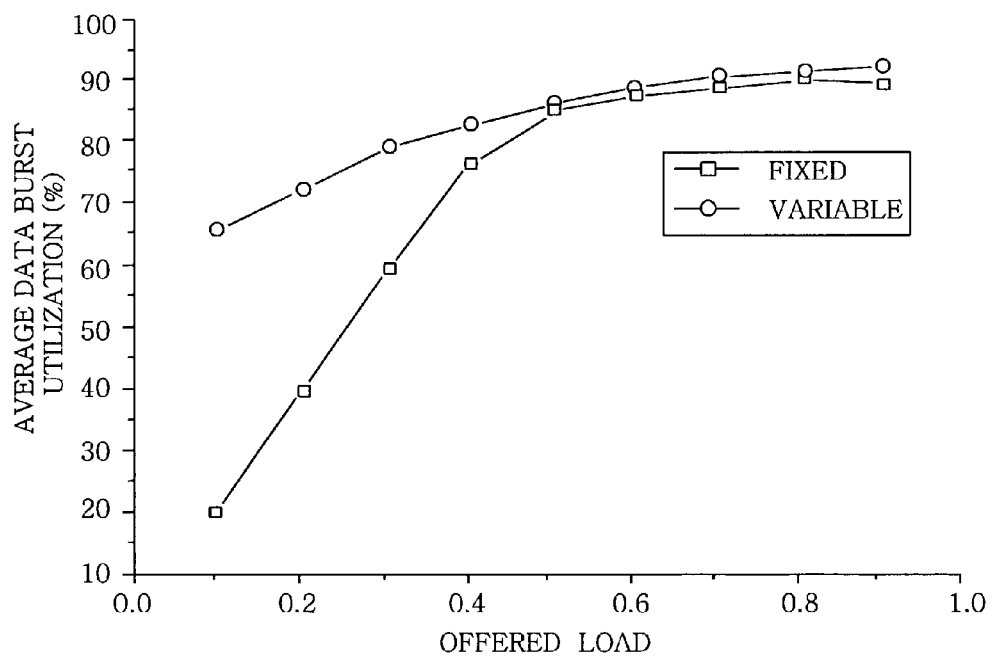
FIG. 17 shows a comparison of average data burst utilization for a fixed and a variable data burst size for Poisson traffic model (Traffic model 1)
Figure 18:
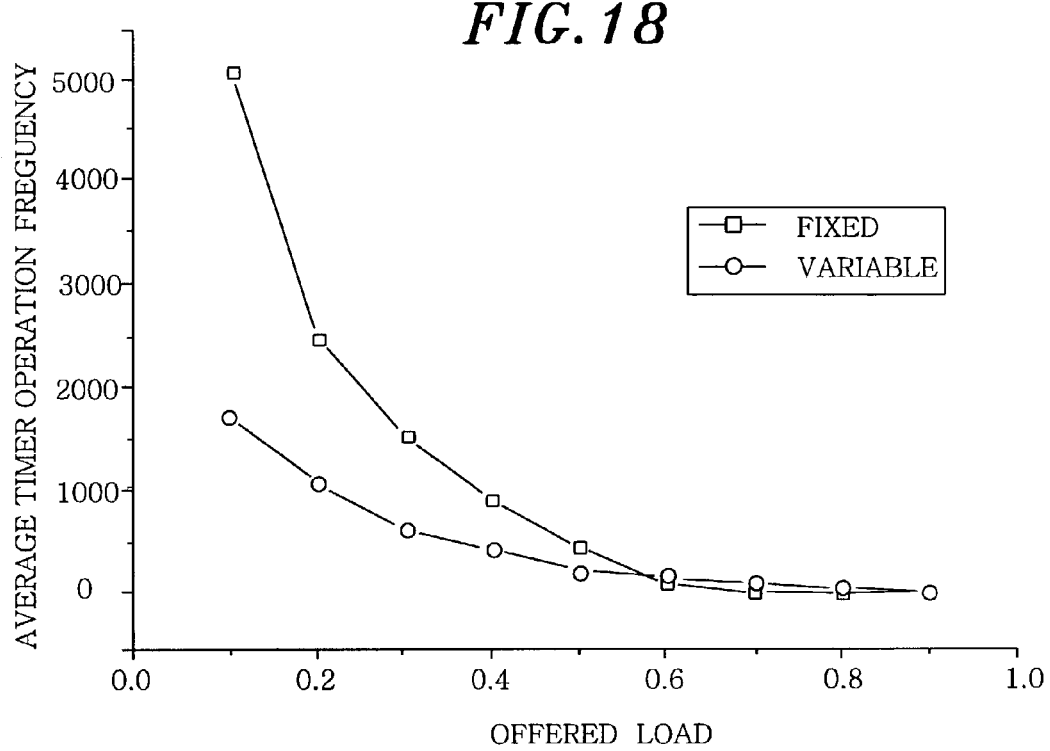
FIG. 18 describes a comparison of an average timer operation frequency for a fixed and a variable data burst size for Poisson traffic model (Traffic model 1)

FIG. 17 compares the average data burst utilization for fixed and variable data burst sizes in exponentially distributed traffic (Traffic model 1). The data burst utilization is defined as the sum of the total IP packet size in the data burst over the data burst size. Using the proposed algorithm, when the offered load was below 0.5, the variable burst offered higher-data burst utilization. The timer operation frequency is compared in FIG. 18. The proposed algorithm offered lower timer operation when the offered load was below 0.5, so it reduced the probability of continuous blocking in the bandwidth reservation request.

Figure 19:
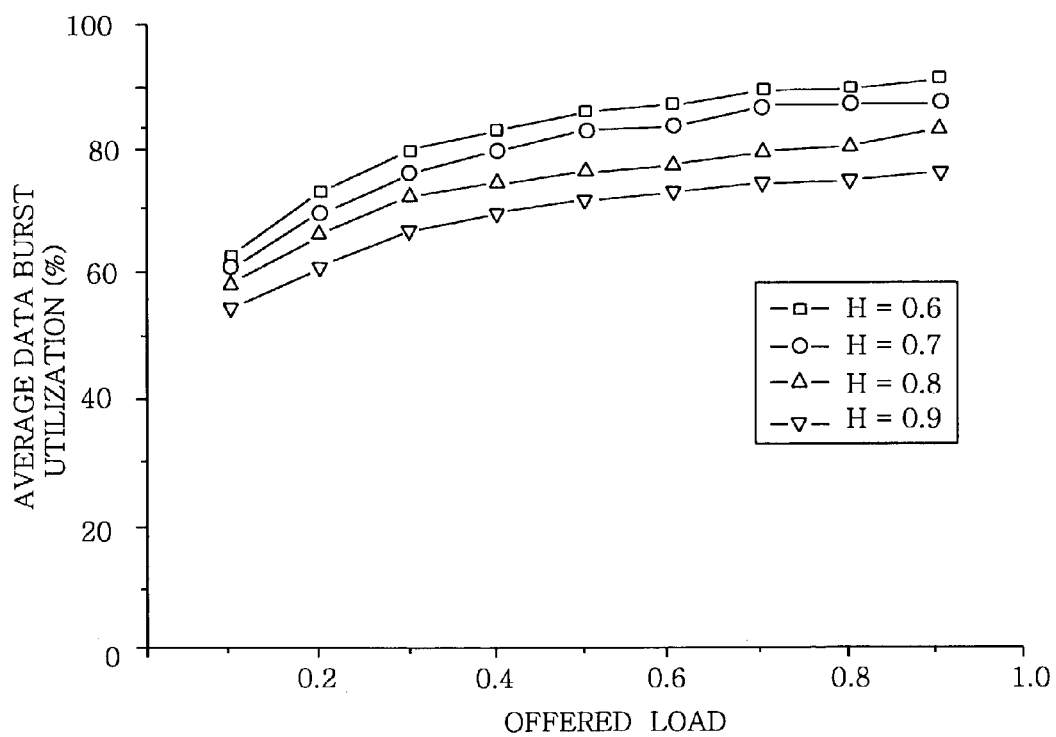
FIG. 19 provides an average data burst utilization for self-similar traffic, wherein H=0.6 to 0.9.

FIG. 19 shows the average data burst utilization for Traffics 2 to 5. (H=0.6 to H=0.9). The proposed algorithm offered a higher average data burst utilization as the burst increased and offered over 50% of the average data burst utilization even in the worst case of high burst and a low offered load.

Figure 20:
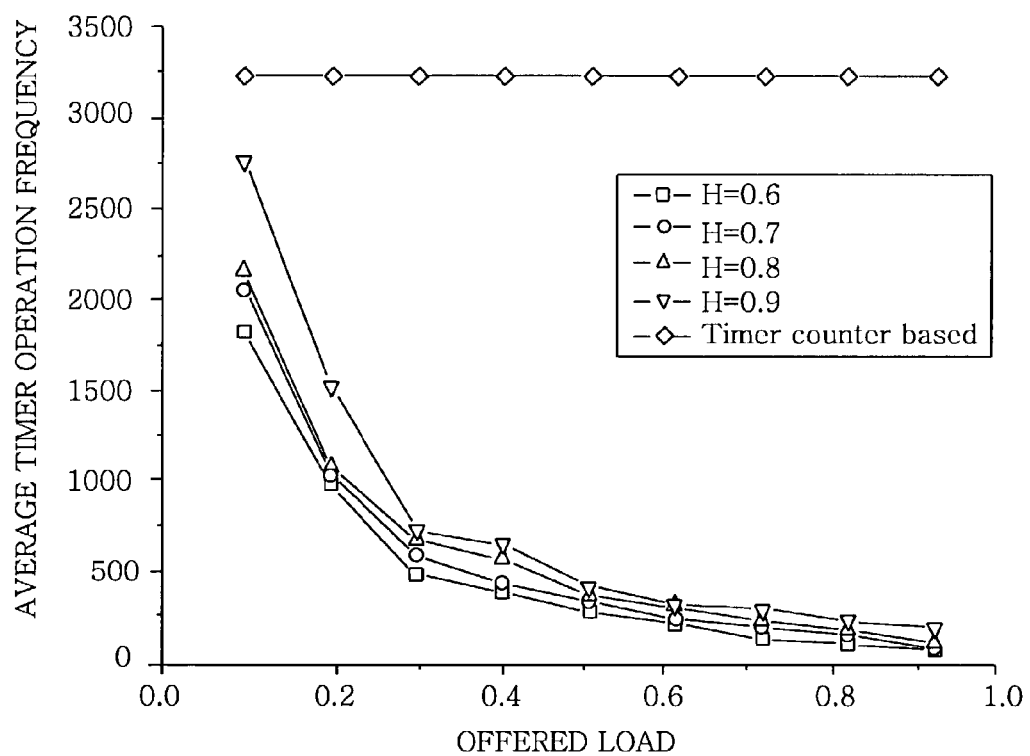
FIG. 20 depicts a comparison of an average timer operation frequency of timer-count based scheme and data burst assembly algorithm in accordance with a preferred embodiment of the present invention for self-similar traffic, wherein H=0.6 to 0.9.

FIG. 20 compares the average timer operation frequency of the timer-count algorithm and the proposed algorithm. The timer-count algorithm periodically aggregated input IP packets using the timer, so several bandwidth-requests at the intermediate node were nearly synchronized. However, the proposed algorithm assembled multiple IP packets non-periodically. The proposed algorithm had a lower average timer operation than the timer-count algorithm, so it had lower continuous blocking probability in bandwidth reservation requests.

Figure 21:
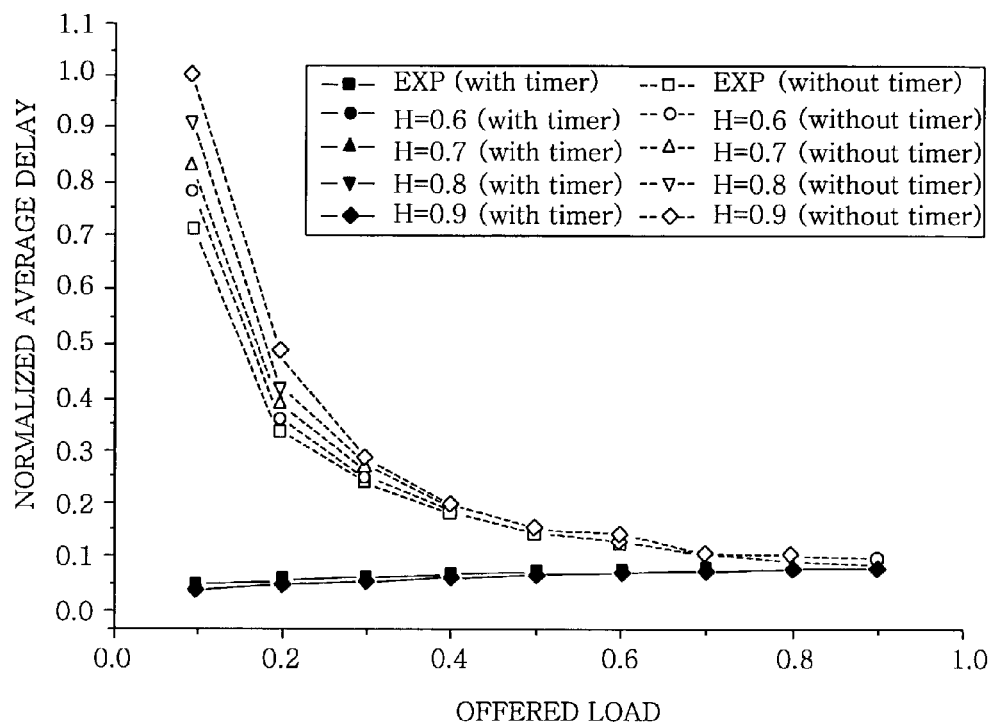
FIG. 21 shows an average delay for different traffic models with/without timer.
Figure 22:
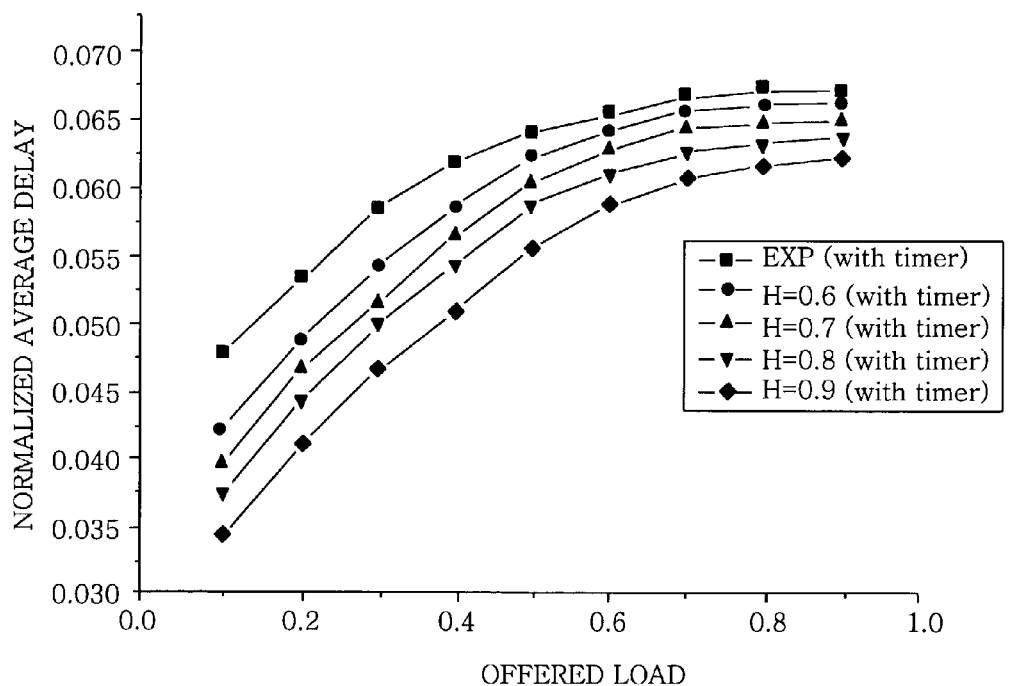
FIG. 22 is an average delay for different traffic models with timer in enlarged form as is shown in FIG. 21.

FIG. 21 compares the average delay for different traffic models with a timer and without a timer. The data burst generation algorithm using a timer resulted in a low average delay as anticipated. Interestingly, with more burst there was shorter average delay as shown in FIG. 22, although the difference was rather small. This was because the burst traffic brought a more frequent timer operation with low data burst utilization. In other words, the average delay traded off the data burst utilization.

As a result of this simulation, the burst generation algorithm in accordance with the present invention shows that the algorithm in accordance with the preferred embodiment of the present invention adaptively changes the data burst size in accordance with the offered load and offers high average data burst utilization of over 50% of the average data burst utilization even in the worst case of high burst and a low offered load with a lower timer operation. It also reduces the probability of a continuous blocking problem in the bandwidth reservation request by using non-periodic data burst assembly time. And also, it limits the maximum queuing delay and minimizes the required burst size by increasing data burst utilization for burst input IP traffic.

While the invention has been shown and described with respect to the preferred embodiments, it will be understood by those skilled in the art that various changes and modifications may be made without departing from the spirit and scope of the invention as defined in the following claims.

What is claimed is:

1. A computer readable medium having a stored control packet for use in an OBS (optical burst switching) network, the control packet comprising:
   a label which is switched to transmit in high speed a packet from a source host to a corresponding destination host;
   a wavelength ID (identifier) for distinguishing a channel and a switching in the OBS;
   a CoS (class of service) field for providing a different type of a CoS for the control packet;
   an offset time for indicating a difference between respective arrival times of the control packet and a data burst thereof;
   a size of the data burst; and
   a CRC (cyclic redundancy checking) for error detecting.

2. The computer readable medium of claim 1, wherein a size of the wavelength ID is 16 bits.

3. The computer readable medium of claim 1, wherein a size of the CoS field is 4 bits.

4. The computer readable medium of claim 1, wherein the offset time is quantized in a form of discrete values.

5. The computer readable medium of claim 1, wherein the offset time is used as TTL (time to live).

6. The computer readable medium of claim 4, wherein the offset time is used as TTL (time to live).

7. The computer readable medium of claim 1, wherein a minimum value of the size of the data burst is determined based on an electronic processing speed, a switching speed of a control channel and a maximum size of a single IP packet.

8. The computer readable medium of claim 7, wherein a maximum value of the size of the data burst size is determined based on a tolerable maximum delay of IP packets.

9. The computer readable medium of claim 1, wherein a maximum value of the size of the data burst size is determined based on a tolerable maximum delay of IP packets.

10. A method for adjusting a size of a data burst in an OBS (optical burst switching) network, comprising the steps of:
   (a) after a timer begins to count as soon as a first packet arrives at a queue, creating a new data burst if a counted value of the timer is larger than a threshold value or if the counted value is smaller than or equal to a predetermined threshold value and a size of the queue is larger than a predetermined low transition condition ($Q_{low}$);
   (b) if the size of the queue is larger than a predetermined high transition condition ($Q_{high}$), increasing a cross-over count by 1 or if the size of the queue is smaller than the predetermined low transition condition ($Q_{low}$), decreasing the cross-over count by 1;
   (c) comparing a cross-over count number with each of a predetermined upper and a predetermined lower limit, and if the cross-over count number is larger than the upper limit, increasing a size of the new data burst and if the cross-over count number is smaller than the lower limit, decreasing the size of the new data burst; and
   (d) resetting the counted value of the timer to 0 and repeating the steps (a) to (d).

11. The method of claim 10, wherein the cross-over count number is changed by using hysteresis characteristics which make use of ranging from the low transition condition $Q_{low}$ to the high transition condition $Q_{high}$.

12. The method of claim 10, wherein in step (c), if the cross-over count number is larger than the upper limit, the size of the new data burst is increased by one step, and if the cross-over count number is smaller than the lower limit, the size of the new data burst is decreased by one step.

* * * * *